United States Patent [19]

Schneider

[11] 4,198,875
[45] Apr. 22, 1980

[54] POWER TRANSMISSION BELT

[76] Inventor: Daniel J. Schneider, 608 Durango Cir. South, Irving, Tex. 75062

[21] Appl. No.: 881,036

[22] Filed: Feb. 24, 1978

[51] Int. Cl.² .......................... F16G 1/28; F16G 1/16
[52] U.S. Cl. ............................. 74/231 CB; 74/231 R; 74/37; 198/847; 156/137; 156/139
[58] Field of Search .............. 74/231 R, 231 C, 231 J, 74/231 P, 231 CB, 237, 234, 37, 232, 233, 235, 236; 198/656, 648, 844, 847; 156/137, 138, 139, 140, 141, 142, 148

[56] References Cited

U.S. PATENT DOCUMENTS

| | | | |
|---|---|---|---|
| 2,823,789 | 2/1958 | Henning | 198/656 |
| 3,485,707 | 12/1969 | Spicer | 74/232 |
| 3,537,571 | 11/1970 | Wiese | 198/844 |
| 3,659,472 | 5/1972 | Engels | 74/231 C |
| 3,673,883 | 7/1972 | Adams | 74/231 C |

FOREIGN PATENT DOCUMENTS 1176766  4/1959  France ......................... 74/231

Primary Examiner—C. J. Husar
Assistant Examiner—David C. Reichard
Attorney, Agent, or Firm—Hubbard, Thurman, Turner, Tucker & Glaser

[57] ABSTRACT

A belt is disclosed capable of transmitting power from a moving member to a pulley which has grooves spaced about the periphery. The belt has teeth spaced along it for engaging the pulley grooves to turn the pulley. Some of the teeth of the belt contain connectors which are engaged by the moving member, thus moving the belt.

5 Claims, 2 Drawing Figures

POWER TRANSMISSION BELT

BACKGROUND OF THE INVENTION

This invention relates to a belt for transmitting power from a moving member to a pulley with grooves spaced around the periphery.

There are situations in which it is desirable to transmit power to a rotating shaft from a member moving in non-rotary motion, such as linear motion. For example, power from a member moved linearly by a stream of water could be coupled to a shaft. In another case, it might be desired to produce shaft rotation in response to the sliding of a part such as a door or a thrusting or pushing member.

The means available to convert motions such as linear motion into rotary motion are quite limited. A rack and pinion gear system can provide such a transformation for motion over a limited range. A cable wrapped around a pulley can be used to rotate the pulley, transmitting force to the pulley by friction. A principal constraint in the latter arrangement is that the cable must be kept quite tight around the pulley. In addition, the forces on the cable must be kept relatively low, or the cable will slip on the pulley. Thus, the cable and pulley system is not suitable where large forces are present that must be transmitted without slippage.

SUMMARY OF THE INVENTION

In accordance with the present invention, there is provided a belt capable of transmitting power from a moving member, for example moving a linear motion, to the rotation of a pulley which has grooves spaced about its periphery. The belt has teeth spaced along it for engaging the grooves to turn the pulley, and has connector means for engaging the moving member and transmitting motion from it to the belt.

In a preferred embodiment of the invention, some of the teeth of the belt contain bushing means with an opening at the side of the belt for receiving a shaft from the moving member.

The teeth of the belt of the invention positively engage the grooves of the pulley used, so that there is no slippage as is possible with a friction drive. For this reason, the belt need not be absolutely tight. Moreover, it is capable of transmitting loads that are considerably higher than those permitted by a friction drive.

Thus, the present invention provides a power transmission means of general utility or converting motion such as linear motion into rotary motion. No such general purpose device is known to exist at the present time.

DESCRIPTION OF PREFERRED EMBODIMENTS

Figure 1:
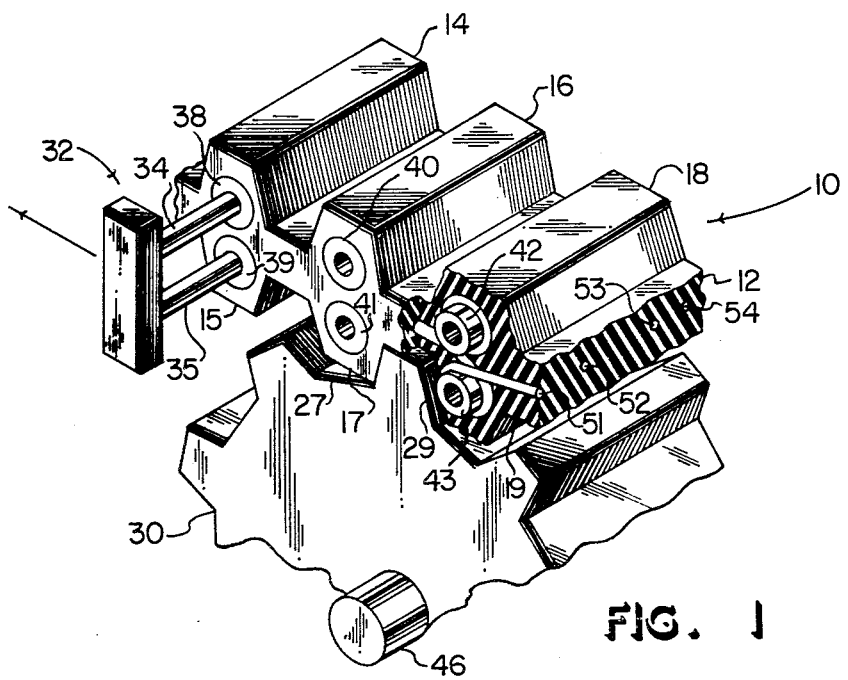
FIG. 1 is a perspective view of a belt according to the invention engaging a grooved pulley, with sections cut away to show internal details.

FIG. 1 shows a belt according to the invention, indicated generally by the reference numeral 10. It is a continuous belt, of which only a section is shown in the figure. The belt has some aspects of a conventional, position drive belt, for example being formed of a flexible but strong material 12, such as Neoprene. Belt 10 has teeth 14-19 spaced along, throughout its length. The teeth of belt 10 are arranged in pairs, like the pair of teeth 14 and 15, in which the teeth of each pair project from opposite surfaces of the belt.

The teeth of belt 10 engage a pulley 30 in grooves which are spaced all around the periphery of the pulley. For example, in FIG. 1, tooth 17 is shown engaging a groove 27, while tooth 19 is shown in groove 29. In use, belt 10 is to be wrapped around a sector of the periphery of pulley 30 which allows contact between a number of teeth and grooves, permitting substantial force transmission between the belt and pulley. Preferably, teeth 14-19 are shaped properly for effective engagement and disengagement with the pulley grooves, according to principles understood with respect to positive drive belts.

Member 32 FIG. 1 is a relatively symbolic representation of any moving member which is to transmit power via belt 10 to pulley 30. Member 32, as shown, includes shafts 4 and 35 which are particularly constructed to connect with belt 10. It should be clear that for almost any type of moving member 32, an adaptor having shafts like shafts 34 and 35 can be constructed for connecting to belt 10. The belt, for its part, has in each tooth a connector for transmitting power from member 32 to the belt. In the preferred embodiment shown, the connector is a receptacle for projections from member 32, namely shafts 34 and 35. The receptacles are in the form of bushings, such as bushings 38 and 39, into which shafts 34 and 35, respectively can be inserted.

Belt 10 has cords 51-54 running longitudinally inside it. The cords reinforce belt 10 as it responds to loads in a variety of directions. In particular, the cords 51-54 are tension-bearing members in the transmission of the force from moving member 32 along belt 10. These cords engage the bushings in the teeth of belt 10 so that force applied to the bushings may be transmitted not only through the material 12 of the belt, but also directly to the cords 51-54. The cutaway section of FIG. 1 shows the engagement of cord 51 with bushings 42 and 43 in a manner particularly adapted to perform the latter function. Proceeding toward the right side of FIG. 1, cord 51 is first wrapped upward in a counterclockwise direction around bushing 42, then down around bushing 43 in the opposite, clockwise direction.

Figure 2:
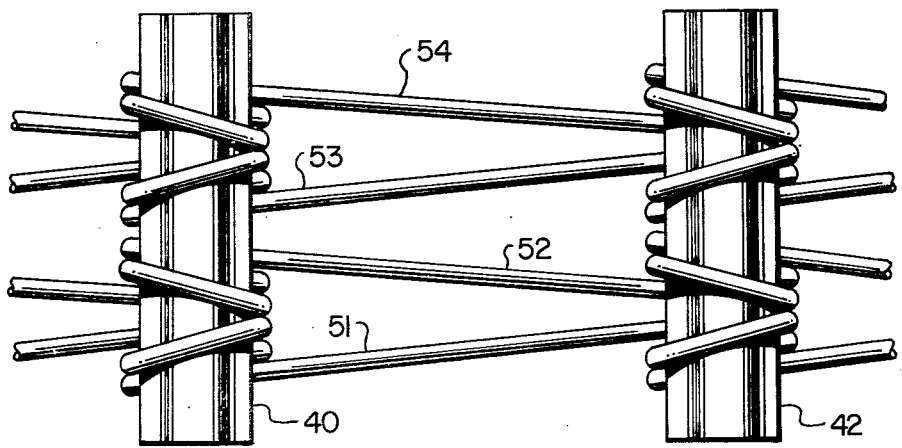
FIG. 2 illustrates an arrangement of reinforcing cords suitable for the belt of FIG. 1.

FIG. 2 is a plan view of a section of belt 10, as it would appear without the material 12. Cords 51-54 are seen to be wrapped around bushings 40 and 42. Additionally, the cords are wrapped around bushings 41 and 43 which are hidden from view below bushings 40 and 42. Beginning at the left of FIG. 2, cord 51 first passes to the right between bushings 40 and 41 (hidden in FIG. 2), then is wrapped toward the viewer and downward and to the left. At that point, cord 51 again passes to the right between bushings 40 and 41, then behind bushing 41 and down and to the left. Finally, cord 51 passes to the right between bushings 40 and 41 for a third time, extending toward bushings 42 and 43.

Cord 52 is wrapped in much the same way around bushings 40 and 41, except that successive turns move the cord toward those ends of bushings 40 and 41 which are at the top of FIG. 2. Thus, the cords 51 and 52 form a symmetrical pair, to which force can be applied in a balanced manner by bushings 40 and 41 during operation of belt 10. Cords 53 and 54 likewise form such a symmetrical pair.

In the operation of the apparatus of FIG. 1, moving member 32 is subjected to a force generally in the longitudinal direction of belt 10. For illustration, the force will be assumed to be toward the left in the figure and along the belt. Additional moving members which may be connected to that portion of belt 10 which is not shown, are also subjected to longitudinal forces. The force on member 32 is applied through shafts 34 and 35 to bushings 38 and 39 respectively of belt 10. The force applied to bushings 38 and 39 is transmitted to that portion of belt 10 in the region of teeth 16-19 and beyond. That is, member 32 moving to the left pulls on bushings 38 and 39, pulling the rest of belt 10 to the left. The teeth of the belt engage the grooves of pulley 30 to turn it in a counterclockwise direction. For example, tooth 19 in groove 29 exerts a leftward force on the upper part of pulley 30. Pulley 30 has a shaft 46, which rotates with the pulley to transmit rotational power elsewhere.

Many of the advantages of the invention can be obtained using a belt having teeth on just one surface of the belt. That is, in a belt having only teeth 15, 17, and 19, with bushings 39, 41, and 43, and not having teeth 14, 16, and 18 or bushings 38, 40, and 42. In such a configuration, the reinforcing cords, such as cords 51-54, can be wrapped one turn around each bushing. Then force from a single shaft 35 pulling on the belt is transmitted through the remainder of the belt approximately as in FIG. 1. If there is just one shaft, shaft 35, it can rotate within bushing 39, permitting, for example, member 32, to maintain some preferred orientation with respect to the vertical, as bushing 39 travels around pulley 30 and other parts of its path.

In the embodiment just described, with teeth on just one side, the bushings can be located in the teeth, just as in belt 10. Preferably, they will be approximately tangential to the plane of the reinforcing cords, that is, to the pitchline of the belt. In such a configuration, a force applied, as by shaft 35, to a bushing is not applied in the plane of the reinforcing cords, but off to one side of the plane. Therefore, the application of force to the bushings is displaced from the principle tension path through the belt. This subjects the bushing, and the tooth in which it is located, to a torque that tends to twist or bend the tooth with respect to the surface of the belt. Such bending represents a significant wear factor in the use of the belt.

By contrast, belt 10 provides for the application of force to its pairs of bushings, symmetrically with respect to the belt and the plane of the reinforcing cords 51-54. The torque applied to bushing 38 is equal and opposite to the torque on bushing 39. As a result, there is no net torque on the pair of teeth 14 and 15, and the corresponding wear is eliminated.

Another advantage of the paired bushings design of belt 10 is the way in which the bushings engage the reinforcing cords. When the belt 10 is pulled by moving member 32, the reinforcing cords 51-54 are under tension. As can be seen in FIG. 1, tension on cord 51, for example, tends to pull bushings 42 and 43 toward each other. This tends to clamp bushings 42 and 43 against the turns of cord that run between them. The bushings become anchored with respect to the longitudinal direction of the reinforcing cords, eliminating a source of stretch or creep in the belt 10.

Another way for the reinforcing cords to engage the connector bushings is for the connectors to be fastened together under pressure. For example, the bushings in a pair can be provided with flanges capable of being riveted or otherwise fastened together.

If the bushings of the pairs are thus fastened, under pressure, they can clamp onto the reinforcing cords between them. The engagement can be enhanced by including a layer of deformable metal next to the cords to closely form itself about the cords.

A number of variations and modifications of the belt according to the invention are possible. For example, each reinforcing cord need not engage each connector or bushing in the way shown in FIG. 2. Each reinforcing cord should be wrapped around some of the bushings, and each bushing should have some cords wrapped around it. The density of interconnection between the reinforcing cords and the bushings is dependent upon the tensile load which the belt is intended to carry.

It is not necessary for the belt 10 to have a pair of connectors or bushings for each pair of teeth. For example, between each pair of teeth with connectors, there might be four pairs of teeth without connectors. The arrangement shown in FIG. 1, where every pair of teeth has a pair of connectors, provides great flexibility in attaching moving members such as member 32 to the belt. On the other hand, a belt with fewer bushings and fewer wrapping of the reinforcing cords is cheaper to manufacture.

A power transmission belt according to the invention can be equipped with varieties of connectors other than the bushings 38-43 shown for belt 10. In one embodiment, the connectors can be receptacles for receiving projections from member 32, but having cross-sections other than the circular ones of the bushings. For example, the cross-section of a receptacle can be rectangular or hexagonal. In another variation, connectors located in the teeth of the belt can have protruding elements which fit into receptacles on the moving members. These protruding elements can include fasteners such as hooks or eyes.

It is not absolutely necessary that the connectors make their connection to the moving members at the sides of the belt. Since the top surface of the belt (as it is seen in FIG. 1) does not engage pulley 30, connectors to member 32 can be located on that surface of the belt.

The bushing connectors used in belt 10 have several advantages. As opposed to protruding connectors, which are exposed to damage, the bushings are relatively durable structures. Moreover, it is relatively straight-forward to provide shafts such as shafts 34 and 35 to fit the circular cross-sections of the bushings. Connecting to the side of the belt as in belt 10 is a convenient form of access for many applications, and allows force to be applied to the belt at the pitchline, avoiding torque on the teeth. Finally, the belt must have teeth on one surface to engage the pulley grooves, and these teeth represent an appropriate place to locate the connector bushings without adding to the bulk of the belt.

Although preferred embodiments of the invention have been described in detail, it is to be understood that various changes, substitutions, and alterations can be made therein, without departing from the spirit and scope of the invention as defined by the appended claims.

I claim:

1. A belt capable of transmitting power from a moving member to a pulley with grooves spaced about the periphery, said belt comprising:

a plurality of teeth spaced along the belt for engaging the grooves to turn the pulley, at least one connector means, in one of said teeth, for transmitting motion of the moving member to the belt; and at least one reinforcing cord running longitudinally in the belt and wrapped around said connector means to thereby engage said connector means.

2. The belt of claim 1, wherein said connector means includes a receptacle for the moving member.

3. The belt of claim 2, wherein said receptacle is a bushing means with an opening at the side of the belt for receiving a shaft.

4. A belt capable of transmitting power from a moving member to a pulley with grooves spaced about the periphery, said belt comprising;

a plurality of teeth arranged in pairs along the belt, with the teeth of each pair projecting from opposite surfaces of the belt, for engaging for grooves to turn the pulley, connector means for transmitting motion of the moving member to the belt, carried by each tooth of at least one of said pairs, and at least one reinforcing cord running longitudinally in the belt and wrapped around each of said connector means in said at least one pair of teeth.

5. The belt of claim 4, wherein said at least one cord is wrapped in opposite directions around the two connector means in said at least one pair of teeth.

* * * * *